(12) United States Patent
Edwards et al.

(10) Patent No.: US 6,952,799 B2
(45) Date of Patent: Oct. 4, 2005

(54) USER INTERFACE FOR NETWORK BROWSER INCLUDING PRE-PROCESSOR FOR LINKS EMBEDDED IN HYPERMEDIA DOCUMENTS

(75) Inventors: Nicholas Hector Edwards, Ipswich (GB); Martin Russ, Ipswich (GB); Paul Garner, Ipswich (GB)

(73) Assignee: British Telecommunications, London (GB)

( * ) Notice: Subject to any disclaimer, the term of this patent is extended or adjusted under 35 U.S.C. 154(b) by 560 days.

(21) Appl. No.: 09/051,118
(22) PCT Filed: Jun. 17, 1997
(86) PCT No.: PCT/GB97/01627
§ 371 (c)(1),
(2), (4) Date: Apr. 1, 1998
(87) PCT Pub. No.: WO97/49044
PCT Pub. Date: Dec. 24, 1997

(65) Prior Publication Data
US 2002/0032699 A1 Mar. 14, 2002

(30) Foreign Application Priority Data
Jun. 17, 1996 (GB) .............................................. 9612627
Jun. 24, 1996 (GB) ............................................. 96304654
Apr. 16, 1997 (GB) .............................................. 9707736

(51) Int. Cl.[7] .......................... G06F 15/00; G06F 17/00
(52) U.S. Cl. ..................... 715/501.1; 715/513; 345/613
(58) Field of Search .............................. 707/501.1, 513, 707/501; 345/333, 334, 335, 356, 336, 839, 619; 704/275; 709/202

(56) References Cited
U.S. PATENT DOCUMENTS

| | | | |
|---|---|---|---|
| 4,873,662 A | | 10/1989 | Sargent ...................... 711/200 |
| 5,459,489 A | | 10/1995 | Redford ....................... 345/179 |
| 5,500,794 A | * | 3/1996 | Fujita et al. ................... 700/83 |
| 5,644,776 A | * | 7/1997 | DeRose et al. ............. 707/500 |
| 5,708,825 A | * | 1/1998 | Sotomayor ............... 707/501.1 |
| 5,708,845 A | * | 1/1998 | Wistendahl et al. ...... 707/500.1 |
| 5,721,851 A | * | 2/1998 | Cline et al. .................. 345/839 |
| 5,737,599 A | * | 4/1998 | Rowe et al. ................ 707/104 |
| 5,748,927 A | * | 5/1998 | Stein et al. .................. 345/333 |
| 5,761,683 A | * | 6/1998 | Logan et al. ................ 707/513 |
| 5,801,702 A | * | 9/1998 | Dolan et al. ................ 345/357 |
| 5,809,317 A | * | 9/1998 | Kogan et al. ............... 707/501 |
| 5,838,906 A | * | 11/1998 | Doyle et al. ................ 709/202 |
| 5,953,732 A | * | 9/1999 | Meske, Jr. et al. .......... 707/513 |
| 6,029,135 A | * | 2/2000 | Krasle ......................... 704/275 |
| 6,034,689 A | * | 3/2000 | White et al. ................ 345/357 |

OTHER PUBLICATIONS

Brown, Mark R. Using Netscape 2, 2nd edition, Que® Corporation, Indianapolis, IN. ©1995. ISBN 0–7897–0612–1. Released Feb. 1996.*

Ernst, Warren, Using Netscape, 1995 Que Corporation, pp. 31–32.*

Behavior Research Methods And Instrumentation, vol. 27, No. 2, Jan. 1, 1995, pp. 200–205, Chu et al, "Creating a Hypertext Markup Language Document for an Information Server".

* cited by examiner

Primary Examiner—William Bashore
(74) Attorney, Agent, or Firm—Nixon & Vanderhye P.C.

(57) ABSTRACT

An interface for a World Wide Web (WWW) browser is described which recognizes HyperText Markup Language (HTML) links embedded in WWW pages. Normally, such links are highlighted on a graphics screen and are activated using a pointing device such as a computer mouse. When each HTML link is recognized by the interface, it is assigned an identifier which can be selected by a user of a system incorporating the interface by means defined by the interface other than a mouse, for example by a keypad.

52 Claims, 10 Drawing Sheets

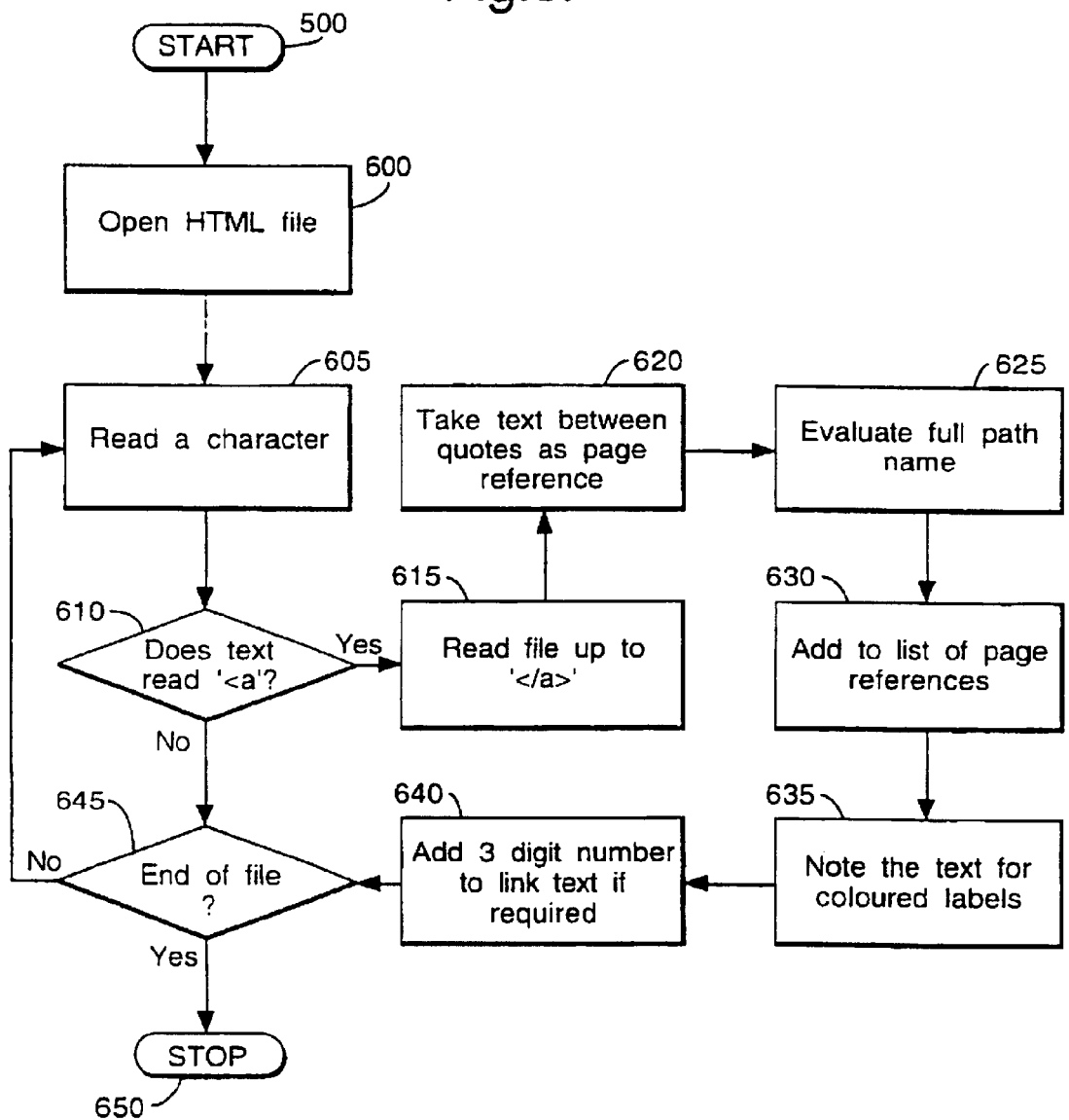

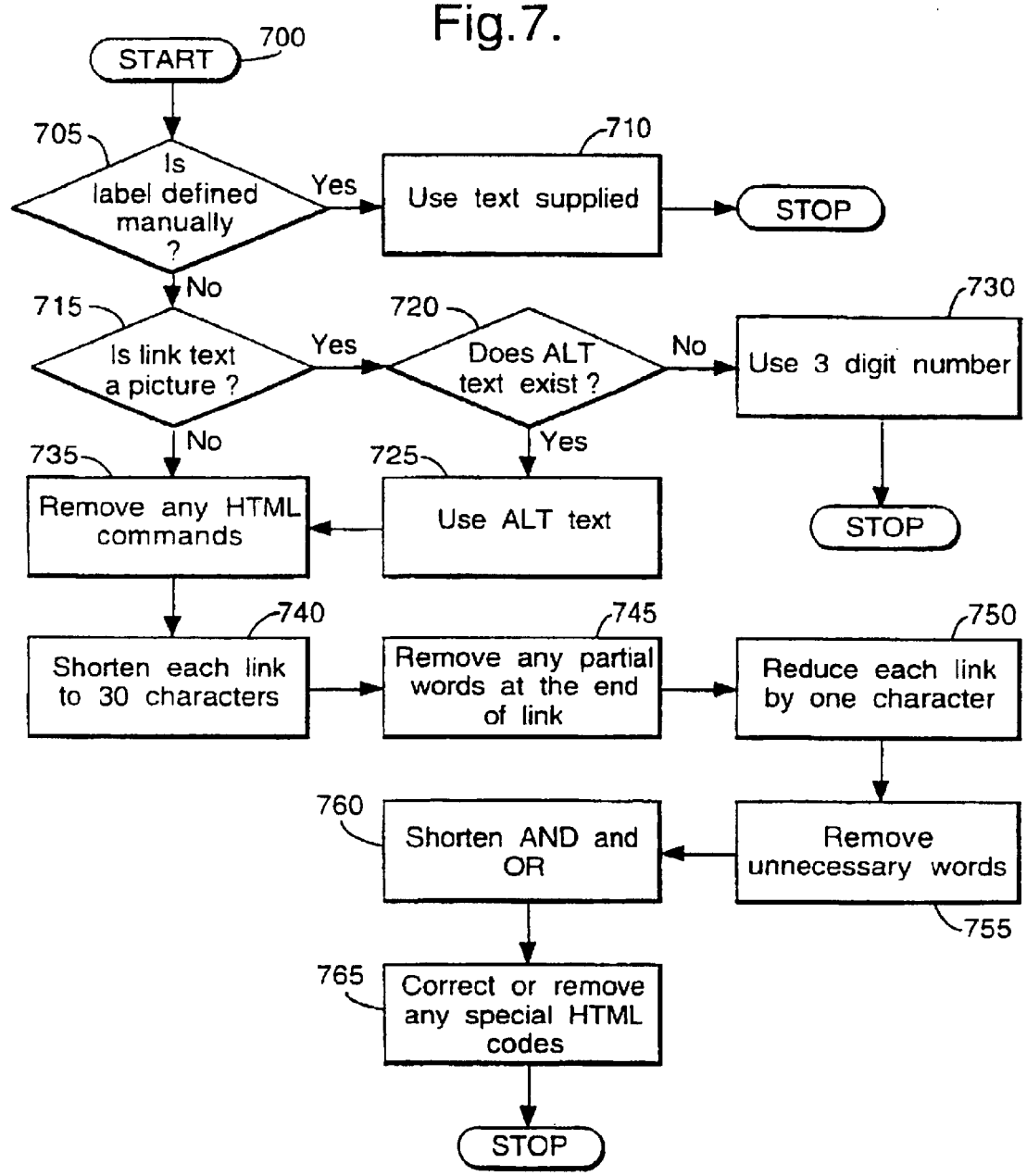

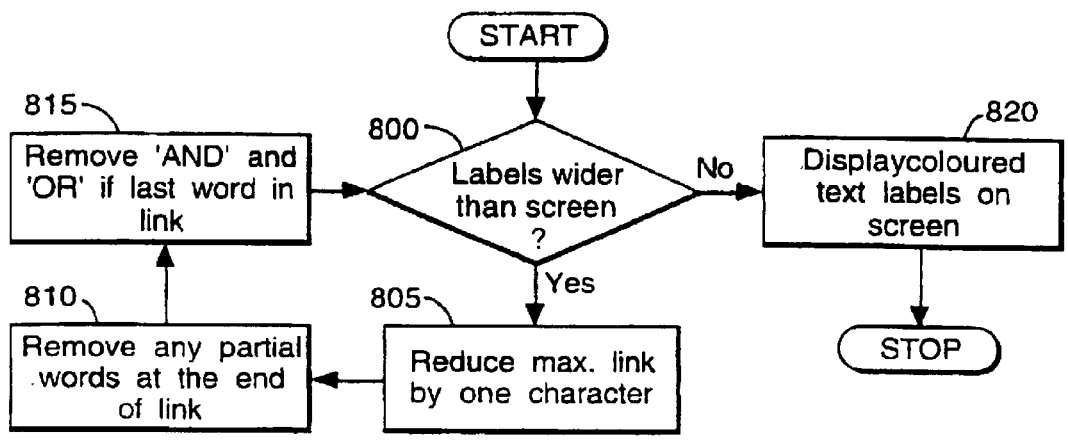
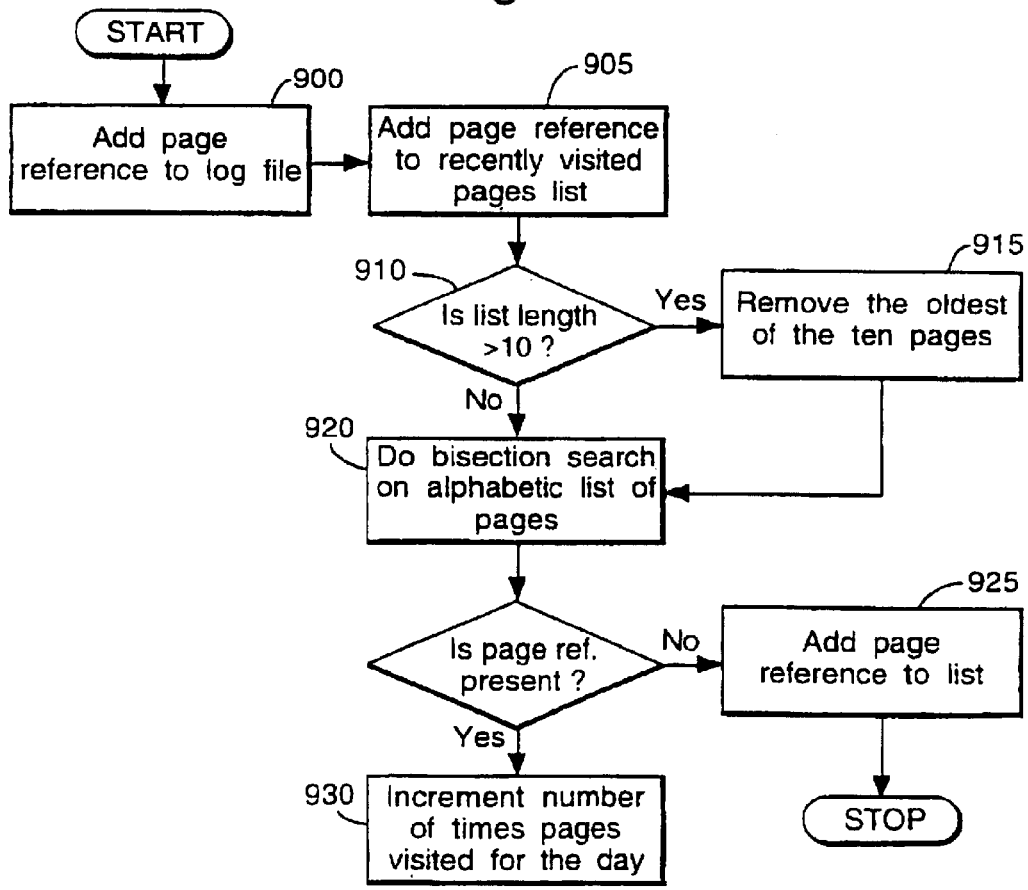

USER INTERFACE FOR NETWORK BROWSER INCLUDING PRE-PROCESSOR FOR LINKS EMBEDDED IN HYPERMEDIA DOCUMENTS

BACKGROUND OF THE INVENTION

1. Field of the Invention

This invention relates to network based access systems in which access is provided by activating links in files containing addresses, for instance in the manner of activating links embedded in files written in HyperText Markup Language (HTML).

2. Related Art

An increasing amount of information is becoming available on distributed communications systems. Most well-known perhaps is the World Wide Web (WWW) area of the Internet, accessed using WWW browsers. Pages consisting of text, graphics, audio files, video files etc. are each associated with an address in a distributed network by means of which they can be accessed. A review and tutorial on HTML, particularly its use in the Web environment of the Internet, is published in the paper entitled "Creating a Hypertext Markup Language Document for an Information Server" by JYM Chu, WL Palya and DE Walter in Behaviour Research Methods, Instruments and Computers, 1995, Vol 27(2), at pages 200–205.

Pages, usually of text, are displayed on a screen. At system startup, the page displayed will usually be provided by a user's browser. Navigation from a first page to a location elsewhere in the network is achieved by means of a link embedded in the first page and visible on screen. Usually, the link holds the address for the second location. When a user "clicks" on the link in the first page, the browser is activated to go to the location address held by the link. Thus the author of any page can make other pages, files or applications accessible regardless of their geographical location by links from their own page to relevant locations in the Internet.

(The term "page" as used herein should not be understood to refer only to pages of text and graphics but also to audio files, video files, Virtual Reality files and computer applications (software) that may be made available via systems such as the Internet and WWW, if the context so indicates.)

Current WWW browsers such as Netscape® use a click from a pointing device (for example a mouse) to select the links and thus to move between pages. That is, the device positions a cursor on the screen so as to identify a selected link. Although 'point and click' navigation is intuitive to people familiar with computer graphical user interfaces, this is not the case for a large proportion of the population. Furthermore there are many situations where a pointing device is not suitable for reasons of: cost, complexity, reliability, size, environment, etc.

SUMMARY OF THE INVENTION

According to the present invention, there is provided an access system for accessing a location in a network by activating a link in a file, which link contains a location address or an identifier for a location address, which system comprises:

i) means for retrieving one or more files;
ii) means for searching a file so retrieved to locate one or more links embedded therein;
iii) means for assigning an identifier to any link so located;
iv) selection means for use by the user to select an assigned identifier; and
v) activating means responsive to selection of an identifier to activate the associated link.

Depending on the nature of the link activated, or on the location associated with the link activated, the access system may then access a data file, such as text pages from the Internet, or may access other types of file, including videos or computer applications, such as conferencing applications.

The location associated with the link activated could alternatively be a location in a communications network, such as a telephone or facsimile number or an electronic mail address. Equipment to enable a communications connection to be established in this way is disclosed in copending British patent applications GB9619958.3 and GB9707712.7 filed on Sep. 29, 1996, and Apr. 16, 1997 respectively, in the name of the present Applicant.

By providing identifiers for the links, and providing a way of selecting a link via its identifier instead of operating directly, on-screen, on the link, embodiments of the present invention allow use of a different user interface from the pointing type of device, usually a "mouse", usually used with such links. This means that the user can choose an interface which is better suited to them or more available to them than pointing devices such as a mouse.

It is even possible, using an embodiment of the present Invention, to select a link which has been presented to the user non-visually, for instance by sound.

One example of an environment in which a different user interface is already utilised for other purposes is in the home. Remote control handsets are frequently used to control domestic audiovisual equipment, for example: video tape recorders, hi-fi equipment and televisions. Also, a significant proportion of the television sets currently produced for use In the UK are equipped with Teletext which can only be accessed by using a remote control handset. This has established a familiar metaphor for controlling electronic equipment using a command-based control system-based on keypresses rather than pointing. Teletext only functions with prepared information however. It cannot be used in a dynamic, uncontrolled environment such as with information from the Internet.

Embodiments of the present invention can be provided for instance as a terminal, or the like, which can display pages from the World Wide Web, using an alternative "command-based" interface to select identifiers for links embedded in the pages seen on the terminal. For instance, there might be provided a simple Teletext-type remote control handset and simple coloured button-type labels for different links on the screen. The user operates the handset to select a label, rather than having to use a 'point and click' WWW-type interface. Thus users do not have to position a pointer on the screen in order to select a path through a set of information pages. Instead navigation can be achieved by a series of keypresses which activate links.

It should be noted that, although the specific embodiment described below uses a television screen to display the WWW information, the 'command-based' interface is not restricted to use with a television screen: a wide range of other displays can be used. For example, a display panel on a telephone could be used to display the information, with the telephone keypad buttons being used to control the navigation, or a mobile information terminal could be produced, combining the functions of a mobile phone, pager, and personal organiser, whilst using a minimal set of buttons.

An example of the use of telephone keypad buttons being used in conjunction with a screen display is described in copending European patent application number 97300929.3, filed on Feb. 13, 1997 by the present Applicant.

The physical implementation of the command interface need not be based on a key-pad on a remote control handset. There are a large number of alternative ways of providing user commands, and some of these are also detailed below.

An application which could be accessed by an embodiment of the present invention is a conferencing application. Screen-based audio-conferencing applications are described in copending British patent application numbers GB 9620000.1, filed on Sep. 25, 1996, GB 9620260.1, filed on Sep. 27 1996, and GB 9705097.5, filed on Mar. 12, 1997, and in copending European patent application number EP 97302615.6, filed on Apr. 16, 1997, all in the name of the present applicant. By accessing a location at which an audio-conferencing application is accessible, the user would in fact most likely first be offered a text page for registration in the conference. Hence the launching of the conferencing application could be very similar to accessing a text page from the Internet.

An application to be launched is determined by a file extension of the link address. Another example of such an application is a video viewer which allows a user to view moving pictures. Many methods of coding moving pictures are available. One widely adopted technique is that defined by International standard ISO-IEC11172 "Coding of Moving Pictures and Audio for Digital Storage Media at up to About 1.5 Mbit/s", known as MPEG1. Files which conform to MPEG1 are conventionally named with a file extension of ".MPEG" or ".MPG". Files which are suitable for viewing with a QuickTime® viewer from Apple® conventionally have a file extension of ".MOV". If a link to such a file is located, an identifier is assigned to the link and an application is launched automatically if a user has specified the application to be associated with a particular file extension. Otherwise the user is asked to specify the application to be launched. Similarly a link may require a video conferencing application to be launched and a video conferencing connection to be established. Such links need to include an application specific file extension for example ".VCL" for a videoconferencing link.

A particularly advantageous aspect of the present invention is that difficulties which would normally be met in presenting Web-compatible pages on a screen not normally for that purpose can be overcome. As mentioned above, the links in a Web-compatible page are designed to be selected by the user using a pointing device to place a cursor at the position of the link in the text. Without a pointing device, it is not possible to select the link. However, by assigning a more generic identifier to the link, it becomes possible to use for instance a keypad.

The identifier assigned to a link may be any of several types of identifier. It needs to identify each link as different from other links viewable at the same time on screen and it needs to be selectable by a non-pointing device such as a keypad. Hence, examples of identifiers assigned to links could include colours, each link being shown on screen in a different colour. Coloured buttons on a keypad could then be used to select a link. Just the initial letter of a link could be coloured. Another example is a number. Each link could be shown on screen with a number added and a keypad could be used to enter the relevant number.

Numbers lend themselves to use where a link is presented to the user as sound instead of visually. The existing link could have a spoken number added to it and the user would use that number as the link identifier.

The identifier for a link can also be at least partly derived from the normal on-screen appearance of the link. For instance, the identifiers might be truncated versions of the text (or graphics) of the link itself. These identifiers might appear on screen in addition to the link itself. Hence the links may appear embedded in the text on screen as is usual with Web pages, but there may also be provided an area on screen which shows just the identifiers, for ease of selection. In order to relate the identifiers to the links, it is useful that the identifiers include a truncated version of the text (or a symbol perhaps) from the relevant links. Embodiments of the present invention provide a means to generate that form of identifier at the client end, thus allowing any original text having embedded navigation links to be used with such embodiments of the present invention.

In more detail, although it is possible for the author of a page incorporating a link to design the link specifically so that it could be used by embodiments of the present invention, in Internet environments that would clearly have to be done in the page stored at the server to be accessed. It would be impractical in the usual Web-type environment to control the page design at all accessible servers. In order to make the system practical for all accessible pages, files, applications etc over the Internet, embodiments of the present invention are based on a client environment which controls the way the links are shown at the client end. That is, a client device is provided which reads retrieved links and converts them wherever necessary by assigning an identifier which may in practice replace or supplement the link as it was originally authored, for display at the client device.

As indicated above, it may be preferred, for clarity, that embodiments of the present invention display not only the links as they appear in a page of text, but also the identifiers, displayed in a dedicated area of the screen. These identifiers may be provided by a set of "hot buttons" which repeat the functionality of the links. For instance, it might be clearer to the user to have an array of buttons to select from, in an area across the bottom of the screen. This would be particularly so for a user familiar with the Teletext environment. Small display screens may not have the space available to show the page of text as well as an array of "hot buttons" having the originally authored on-screen appearance of the links. Embodiments of the present invention can then be particularly useful by replacing lengthy link descriptors with simple identifiers, such as numbers or colours, at least for an array of "hot buttons" added to the page of text.

Embodiments of the present invention are useful in environments where the size of the text is large relative to the screen area available for display, but the user is still going to need to select links. This occurs, as mentioned above, in cases where the screen display is simply small, such as in an aircraft where individual screens are provided for users. It also occurs however where it is required to provide large text, for instance because the user has reduced visual ability or because the screen has to be visible from a distance. Embodiments of the present invention are generally useful in the manner in which link on-screen appearance can be tailored for the user environment without loss of functionality.

In general, embodiments of the present invention can provide a browsing capability, providing functionality for retrieving data and acting interactively as in known Internet browsers, with the added aspect of dynamic pre-processing of information at the user interface.

BRIEF DESCRIPTION OF THE DRAWINGS

A terminal and interface system, herein referred to as "the Easy Terminal", will now be described as an embodiment of the present invention, by way of example only, with reference to the accompanying Figures in which:

FIG. 6 shows a flowchart of a process used to analyse HTML to find links to other pages;

FIG. 7 shows a flowchart of a process for creating text for text buttons in a display for the Easy Terminal;

FIG. 8 shows a flowchart of a further process for creating text for text buttons in a display for the Easy Terminal;

FIG. 9 shows a flowchart of a process for recording history of pages accessed by means of an Easy Terminal;

DETAILED DESCRIPTION OF THE EXEMPLARY EMBODIMENTS

As described above, the Easy Terminal provides a simple information interface. The system is designed to provide an interface to electronic information in the form of pages of text and graphics, audio files, video files etc. which can be accessed using key-presses. The information is derived from the WWW and is simplified and processed before being displayed.

Figure 1:
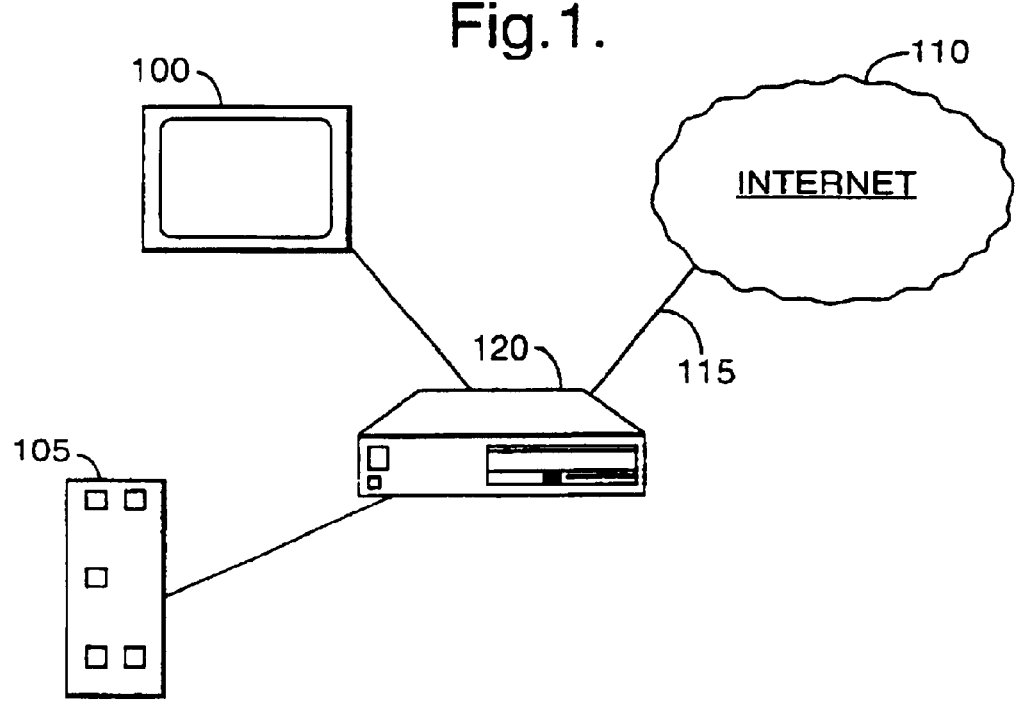
FIG. 1 shows schematically the main components of the Easy Terminal.

Referring to FIG. 1, the main components of the Easy Terminal are a display 100, controlled by the user from a remote control handset 105. Information is accessed on the WWW 110 via a network connection 115, and processed by the Easy Terminal process software 120.

Effectively, Easy Terminal provides a Web browser of known type but with a significantly different user interface providing significantly different control functionality.

The display unit 100 is a standard television. In order to ensure maximum legibility of text on the screen, large sans-serif fonts are used as much as possible. Anti-aliased fonts should be used if they are available. Text and background colours are chosen to ensure good contrast.

In addition to proportionately spaced text as described above, the screen can display high resolution colour images.

Figure 2:
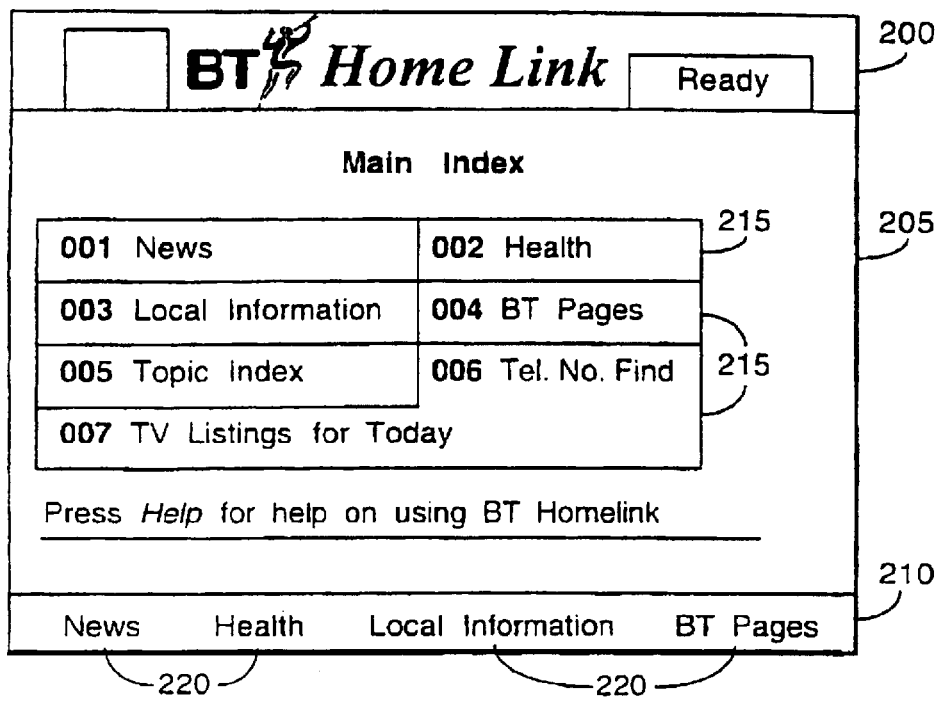
FIG. 2 shows an example of a welcome screen.

Referring to FIG. 2, on switch-on, the user is presented with a welcome screen with a general layout divided into three sections:

Masthead 200
Body 205
Footer 210

The Masthead 200: the upper part of the screen acts as a fixed "masthead" which is used to identify the name of the service being provided, as well as provide feedback to the user. For instance, the number entered from the key-pad would appear at the upper left in this example, whilst the status appears at the upper right ('Ready').

The Body 205: the main portion of the screen is devoted to displaying WWW pages and/or processed WWW information. This part of the screen can be scrolled so that viewed pages can be larger than the available screen area. (The masthead and footer are not affected by this scrolling.) In general, pages which are displayed are made up of five major elements:

Headings which are normally large and in bold type. In this case, "Main Index" is shown.

Text

Links 215 (normally shown as highlighted text with an optional preceding three digit number Graphics (pictures)

Tables

Some pages, for instance home pages for particular services, may be simply a list of links from which the user can select further pages to access. The further pages will then generally comprise a mix of text and/or graphics and tables, with links embedded at irregular positions. The example shown in FIG. 2 is of the home page type, showing simply a list of links.

The Footer 210: the lower part of the screen is also fixed, and provides space for four coloured text labels 220—the colours are matched to the four colours of the buttons provided on the user's key-pad: Red, Green, Yellow, Blue. These are shortened versions of links 215 appearing in the body of the display 100 and are labelled with either descriptive text for the links 215 or a three digit number. The labels 220 enable any one of the links 215 in the body 205 of the display 100 to be activated. The labels 220 appear in a group of four and initially relate to the first four links 215 shown in the body 205 of the display. As the links shown in the body of the display are scrolled through, the labels can also effectively be scrolled through by activating a "Next" key on the keypad 105 which steps the labels on to show the next set of four links. Hence, if the labels display descriptive text or a link number, this can be changed as the links are scrolled. When all the links have been scrolled through and displayed, then the first set are re-displayed.

If descriptive text is used for the labelling, this can be derived from the link text shown in the body of the display 100.

Figure 3:
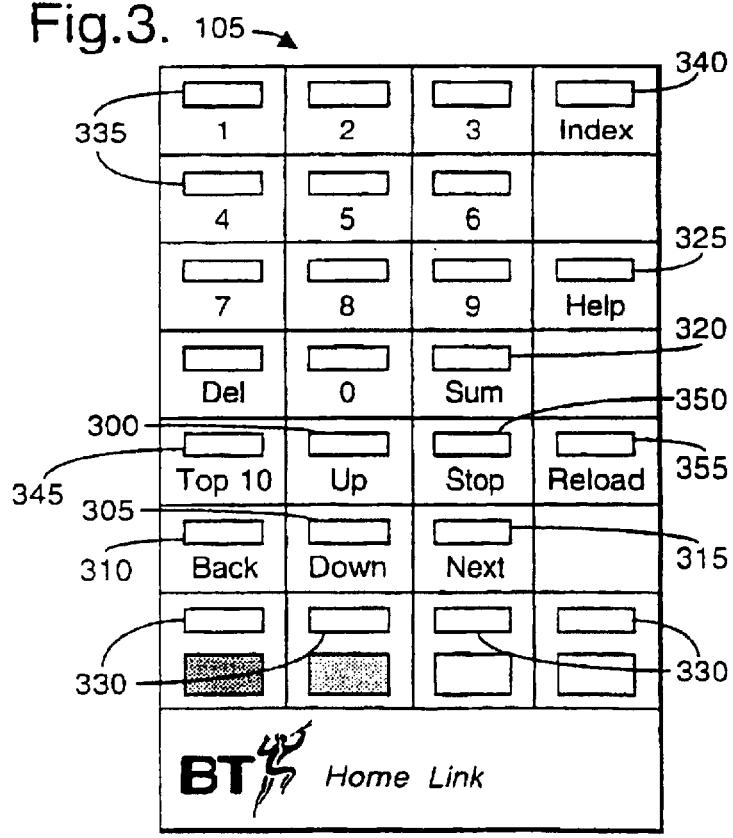
FIG. 3 shows an example layout for a remote control handset for use in the Easy Terminal.

Referring to FIG. 3, the user may then access new WWW pages, which will take over the body of the display 100, using the remote control handset 105. The remote control unit 105 in this implementation is a television-type unit with a keypad. An example of a suitable handset has 25 buttons, as shown in FIG. 3.

Twenty-five buttons represents a good compromise between the number of available functions and the numbers of buttons available on common remote control handsets.

Up and Down keys 300, 305 on the keypad scroll the current page seen in the body of the display 100 up and down. This can be done in a way which is referred to herein as "clever scrolling". The use of the Up and Down keys 300, 305 to move the on-screen view of the HTML page can be in two modes. The default mode is to provide scrolling which is related to the links on the page. When a page is initially displayed, the first four links are coloured to show their association with the four coloured buttons on the remote control or the on-screen coloured text label area. If the Down key is pressed, then the next four links on the page are coloured and the first four links revert to a default colour used to indicate links which are not available via the remote control or the on-screen coloured text label area. When the user presses the Down key, the system does a check as to whether there are links on the page which are not currently highlighted. When the last visible link on the page is coloured, then any subsequent pressing of the Down key will cause the screen to roll downwards (one line at a time) until either the end of the document is reached, or another link becomes visible which is not coloured. A similar mechanism can be used for the scrolling upwards process.

"Clever scrolling" in this manner is described in more detail below, with reference to FIGS. 12 to 14.

A Back button 310 can also be used for scrolling upwards in a minimal-button interface.

A Next button 315 can also be used to scroll the display—but this is linked to the number of links which are visible on the screen, and is intended for specialist applications where a minimal button-set is required. The Next button scrolls the body of the display downwards until four links are visible. These can then be activated by respective coloured text labels in the Footer of the display 100. Pressing the Next button then scrolls the display to present either the next page of text, or the next four links. Links 1, 5, 9 etc are thus always associated with the Red button, links 2, 6 and 10, etc the Green button, and so on. in a non-minimal-button interface, the Next button is used to select the next four links on the page, regardless of their being displayed on the current screen—the coloured text labels would then update to reflect the change of links.

A Summary button 320 uses an online text summariser to produce a shortened form of the current page.

By pressing Help 325 and selecting Settings from a "user setup" page, the user may enlarge or reduce the size of the text, and select whether just text characters or pictures and text characters are displayed.

A new page may be selected by one of two methods:
Link and Number buttons
Navigation buttons The Link and Number buttons are the four coloured buttons 330, plus the numeric buttons 335. As mentioned above, the links in the body of the display 100 may have a preceding three digit number. To use the Link and Number buttons to select a link to activate, either one of the coloured buttons 330 can be pressed, or a three digit code can be used, using the numeric buttons 335 on the keypad 105.

If one of the coloured buttons on the remote control is pressed, this will produce a new page corresponding to the appropriate coloured label 220 in the footer of the display 100. The label 220 will be showing a description identifying the link it is currently related to in the body of the display 100—it is this related link which will then be activated.

If alternatively a three digit code is entered, using the numeric keypad 105, as soon as the third button is pressed, then the associated link is activated and a new page is retrieved. If a correction is required, the most recently entered digit may be deleted with the Del key.

There are many possible Navigation buttons which provide dedicated functions when they are pressed. Some of the possibilities include:

Back 310 allows the user to return to the page previously displayed

Index 340 displays the main index page which is seen at switch-on

Help 325 displays a menu of help pages on the use of the terminal

Top 10 345 displays a list of pages which have been frequently and recently visited.

There are also three control keys which allow the user to control the loading of the pages:

Stop 350 Abandons the retrieval of a requested page. This may be used if the page is unavailable because of network problems or if the download is unacceptably slow Undo (not
shown) This button can be used to combine the functions of the Stop and the Del key—using the context at the time of use.

Reload 355 This refreshes the current page, downloading a new copy from the network. This may be used to ensure that the displayed page is up-to-date.

Smaller numbers of buttons can be used by omitting features, or by requiring combinations of buttons to be pressed simultaneously. A minimal set of buttons would be approximately six buttons: the four coloured buttons, plus the 'Next' button, and a 'Back' button. The precise function of the named buttons is described later.

An example of a minimal set of buttons is provided by the simple "game pad" controller—as used widely for home video/computer game consoles. The "game pad" consists of eight buttons arranged in two groupings: four coloured buttons plus an additional four buttons conventionally used to indicate direction, rather like a primitive joystick.

The utilisation of the game pad buttons in an embodiment of the present invention is as follows:

a the four coloured buttons are used to select links on the page

"Up" and "Down" buttons which scroll the page and the coloured links (using "clever scrolling" as described below)

a "Back/Delete" button. This functions as "back" except when the user is editing text, in which case it functions as "delete"

an "Index/Finish" button. This takes the user to a main index page unless text is being edited, in which case it finishes the text Other minimal button interfaces are also possible. The interface provision of embodiments of the present invention can be easily extended.

Figure 4:
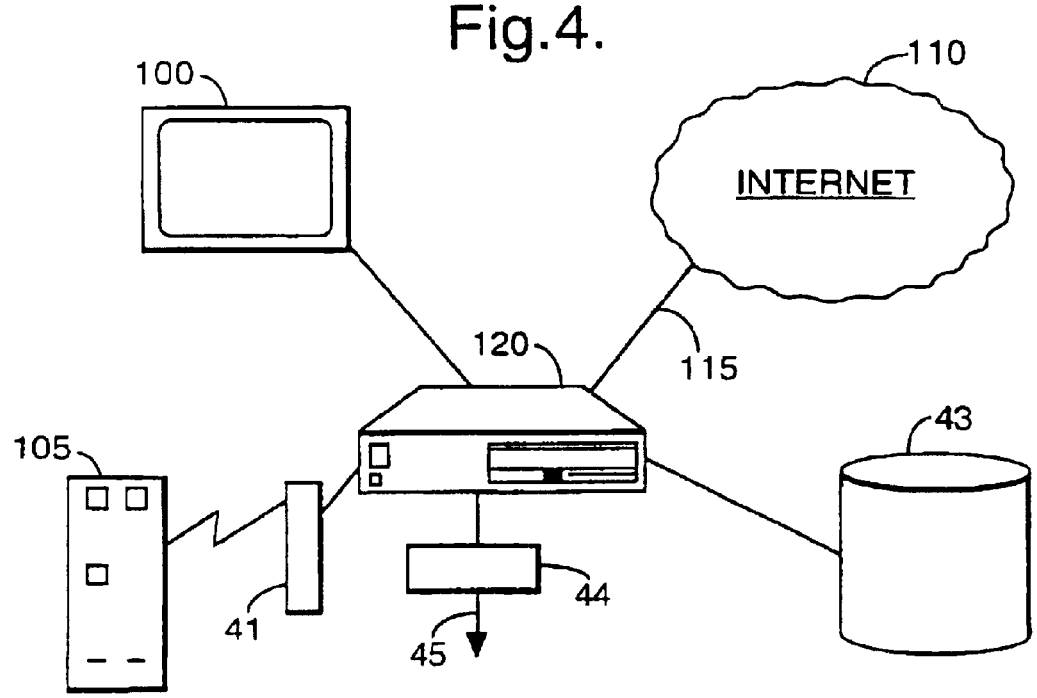
FIG. 4 shows a block diagram of the Easy Terminal hardware.

Simple keypads that provide only the digits 0 to 9, plus two additional buttons (conventionally as a three column by four row block) can be used by redefining the function of the buttons on the keypad:

the "0" button becomes the "Back" button the two additional buttons are used for paging upwards and downwards Referring to FIG. 4, the implementation of the Easy Terminal described here consists of a hardware platform and the associated software. The system is a linked mixture of hardware and software elements, and both parts are required to produce the display.

The hardware platform for the embodiment of the Easy Terminal described here consists of a number of components. Many of these would be common to most alternative implementations.

The components are detailed below:

| | |
|---|---|
| Communications Network 110 | An Ethernet based connection to the Internet |
| Network Link 115 | An Ethernet communications card for a personal computer (PC) |
| Processor 120 | A Gateway ® P4D-66 IBM ® Compatible PC Computer with 486 DX2/66 Processor. |
| Hard disk 43 | A 540 MB Internal Hard Disk Drive |
| Infra-red Handset 105 | A Propresenter Plus 25 button handset for PC |
| Infra-red receiver 41 | A Propresenter URC receiver for PC |
| Graphics Card 44 | An ATI MACH 64 PCI graphics card |
| TV Output 45 | Derived using a Creative Laboratories TV Coder for PC |

The hardware is in four parts:
Control
Input
Processing
Output

The Control hardware comprises the Infra-red Handset 105 and Receiver 41.

The Input hardware comprises the Communications and Network Link 115, which connects the PC to the WWW 110.

The Processor 120 itself carries out the Processing of the Control and Input data in order to produce the Output display.

The Output is in the form of a TV picture, produced from the computer display by using a graphics card and a specialised TV converter.

Figure 5:
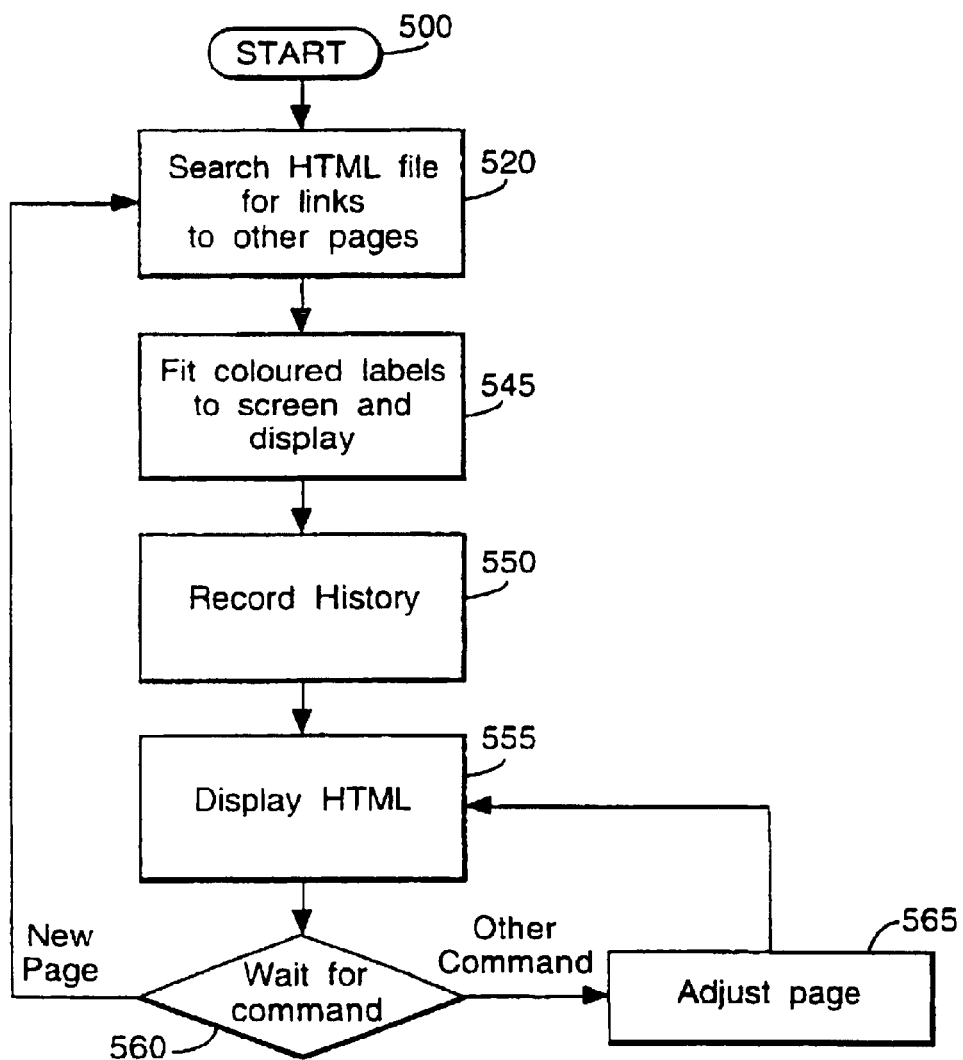
FIG. 5 shows a flowchart overview of the software processes of the Easy Terminal.

FIG. 5 shows a flowchart showing an overview of the software and the processes carried out in the Easy Terminal. The code is written in Borland Delphi (Object Oriented Pascal) for Microsoft® Windows 3.1. The primary steps are as set out in FIG. 5:

| | |
|---|---|
| STEP 520 | Search HTML file for links to other pages |
| STEP 545 | Fit coloured labels to screen and display |
| STEP 550 | Record history |
| STEP 555 | Display HTML |

Referring to FIGS. 6, 7, 8 and 9, each of the primary steps 520, 545, 550, 555 shown in FIG. 5 is now described in more detail.

Search HTML File for Links to Other Pages: STEP 520

An HTML file contains reference to other pages (also known as "links") in the following form:

<A HREF="page reference">Link Text</A> where the <a and </a> are tags which indicate the beginning and end of the reference respectively. The page reference indicates the WWW address of the page indicated, and will be in the form "http://. . . ". Note that those parts of the address which are the same as the present page are not always given, and that some expansion of the address is often required to create the complete address required.

Referring to FIG. 6, when a new page is to be displayed in the body of the display 100, it needs to be searched, STEP 520, for links to other pages so that those links can be differently displayed from ordinary text in the body of the display 100, and so that the labels in the footer of the display 100 will display appropriate colours or descriptions.

The system will therefore start, STEP 500, for instance, when a new (unprocessed) page has been accessed, usually because it has been requested by a user.

STEP 600: The HTML file containing the page is opened and, STEP 605, the process will read each character of the text in turn to see whether it introduces a reference, or a link, to another page. To do that, it runs a test, STEP 610, "Does text read "<a"?" If the answer is yes, the process will read the file through to the symbol "</a>", STEP 615. Between these two symbols, the process takes the text as a page reference, or link, STEP 620, and evaluates that link for its full path name, STEP 625. (Often HTML addresses are abbreviated to the parts of the address which are different from the current page address. It is necessary to expand these partial addresses so that they can be compared with stored addresses in the history lists etc). The system then adds the link to a list of the links or page references for the page being searched, STEP 630, and stores the text of the page reference prior to processing for the labels, STEP 635.

In STEP 640, the system will add a three digit number to the front of the page reference, or link text, for display in the body of the display 100. This three digit number is also added to the appropriate page reference in the list of links found in the page being searched and will appear in, or at least be correlated with, a label at any time that the relevant link is one of the first four links displayed in the body of the display 100.

The process will then search for further links, until the end of the file is reached, STEP 645, and the process is terminated, STEP 650.

Shortening Link Text: STEP 545

The Easy Terminal displays four coloured text labels at the bottom of the screen. Most Internet link descriptions are too long, and may require truncation in order that the total length of the four labels will fit onto the screen width in a font which is legible on the display.

For the television display used in this implementation, the link descriptions are thus processed in the following way prior to display in order to make them as intelligible as possible.

Referring to FIG. 7, where the text from a page reference has been stored for processing to provide a coloured label, STEP 635, the next step is to process the text for each page reference. This process starts with a check, STEPS 700, 705, whether the page reference contains text to be truncated to provide a label or whether it contains an indicator that a label has already been supplied by a user. If the label has already been supplied, then the system will use that label, STEP 710. The process stops for that particular page reference, moving on to start again for the next.

To allow an author (or other user) to provide the labels, a special-purpose HTML tag has been defined. This enables HTML authors to embed pre-prepared shortened text labels for the coloured text labels. An example would be:

<A HREF="page reference" HOTKEY="Link1">Link text</A>

Thus the functionality of the <A command in HTML is extended.

If the label has not been defined by a user, the process checks whether the page reference, or link, is a picture, STEP 715. If the page reference is indeed a picture, then the process looks for ALT text, STEP 720. If the text exists, this is used for deriving a label, STEP 725. If the ALT text is not there, then the system allocates a three digit number to the page reference concerned and uses this for the label, STEP 730.

Where the page reference was text, or ALT text existed, then the process starts truncating it. It removes any HTML commands, STEP 735. The page reference then has to be shortened.

First each link description is shortened to a length that represents the special case of four numbered links plus one text link, STEP 740. For the television example described here this is approximately 30 characters. Partial words left hanging at the end of a link are removed, STEP 745, and the link reduced by one character, STEP 750. Some unnecessary words such as "THE" and "A" may be removed to reduce the length of the link text still further, STEP 755. Words such as "AND" and "OR" can be shortened to "&" and "/", STEP 760. This process is a simplified form of the technique known as stemming, and more sophisticated processing may be used to improve the truncation efficiency.

Lastly, a number of non-standard HTML codes need to be converted before display, or removed, STEP 765. For example, a copyright symbol is written as ©, and needs to be converted to (C) before display, whilst the emboldening command <B> and its reverse </B> need to be removed.

After this first truncation step, the labels, or "button information", are stored.

Referring to FIG. 8, even after these modifications have been made, the combined link text from the four link labels may still be too long, and will overspill the width of the screen. When the relevant page is to be displayed, the system will then go into a second truncation process. At this stage, the labels are processed in the fours in which they will appear on the screen during display.

The second truncation process makes a check step on the length of the labels, STEP 800. If the labels in combination are wider than the screen, the maximum length of the link labels is reduced by one character (ie first to 29, etc) with the longest link label being processed first, STEP 805. This 'balances' the length of the label text between the links. Partial words at the end of the text are removed, STEP 810. Finally, words like "AND" and "OR" are removed if they are the last word in the label text, and therefore redundant, STEP 815. The reduction of the length is continued until the labels will fit on the screen, and then they are displayed, STEP 820.

Recording History: STEP 550

Referring to FIG. 9, a history of the pages selected by the user is important for a number of reasons:
1) the user may wish to back-track to a page they have recently looked at
2) the user may select a list of the 10 most recently visited pages
3) the user may wish to see a list of the 10 pages which they frequently visit
4) a log of the activity may be kept Most of these functions are relatively simple. However 3) listed above requires more sophistication.

In the current implementation the Easy Terminal maintains a list of the 10 pages most frequently visited in the last 7 days of operation. In order to do this it must first have a list of all pages which have been visited in the last 7 days: a history log containing counters, dates and addresses. The history log associates each page with seven day-counters which count the number of accesses of each page during that day.

Referring to FIGS. 5 and 9, when a new page has been accessed by a user, the page reference is added to an unsorted log file, STEP 900. This is a simple list of all pages accessed and can be effectively of unlimited length. The process of appending a new page reference is straightforward and not further described herein.

The new page reference is also added to a recently visited pages list, STEP 905. The recently visited pages list is maintained at a length of 10 page references by running a check each time a page reference is added, whether the list has gone over 10, STEP 910. If it has, the oldest page reference is dropped, STEP 915. Again, this list is unsorted.

As well as the unsorted log file, an alphabetic list of the names of all pages visited is maintained, together with a count of the number of times a sage has been visited. To update the alphabetic list, a bisection search is carried out to find out whether the page has already got an entry, STEP 920. If no entry is present, then a new entry is created along with a new set of seven counters, STEP 925. If an entry is already present, then the relevant day-counter is incremented, STEP 930.

The alphabetic list allows the user to review which pages have been most frequently visited. A button on a keypad 105 or a three digit code, can be allocated to a function "Show 10 most frequently visited pages". If this is selected, the system can sort the alphabetic list according to the contents of the counters. Thus when a list of the 10 most frequently visited pages is selected, the system counts up the total number of times each of the pages in the list has been accessed over the last 7 days, and sorts the list so that the top ten entries can be displayed.

Each time a page is accessed, the counter for the current day is incremented. When the beginning of a new day is detected, the counters are updated, and pages which have not been accessed over the last 7 days are removed from the alphabetic list.

Other schemes for maintaining a "Top 10" list are of course possible. Some possibilities are suggested below, in discussion of alternative embodiments and possible refinements in the present invention.

Displaying HTML: STEP 555

Commercially available HTML displaying software is used to display the modified HTML code. This is not therefore described further herein. A number of minor modifications need to be made to the code however to remove error messages when images are not displayed and to remove the underlining from HTML hotlinks.

Figure 10:
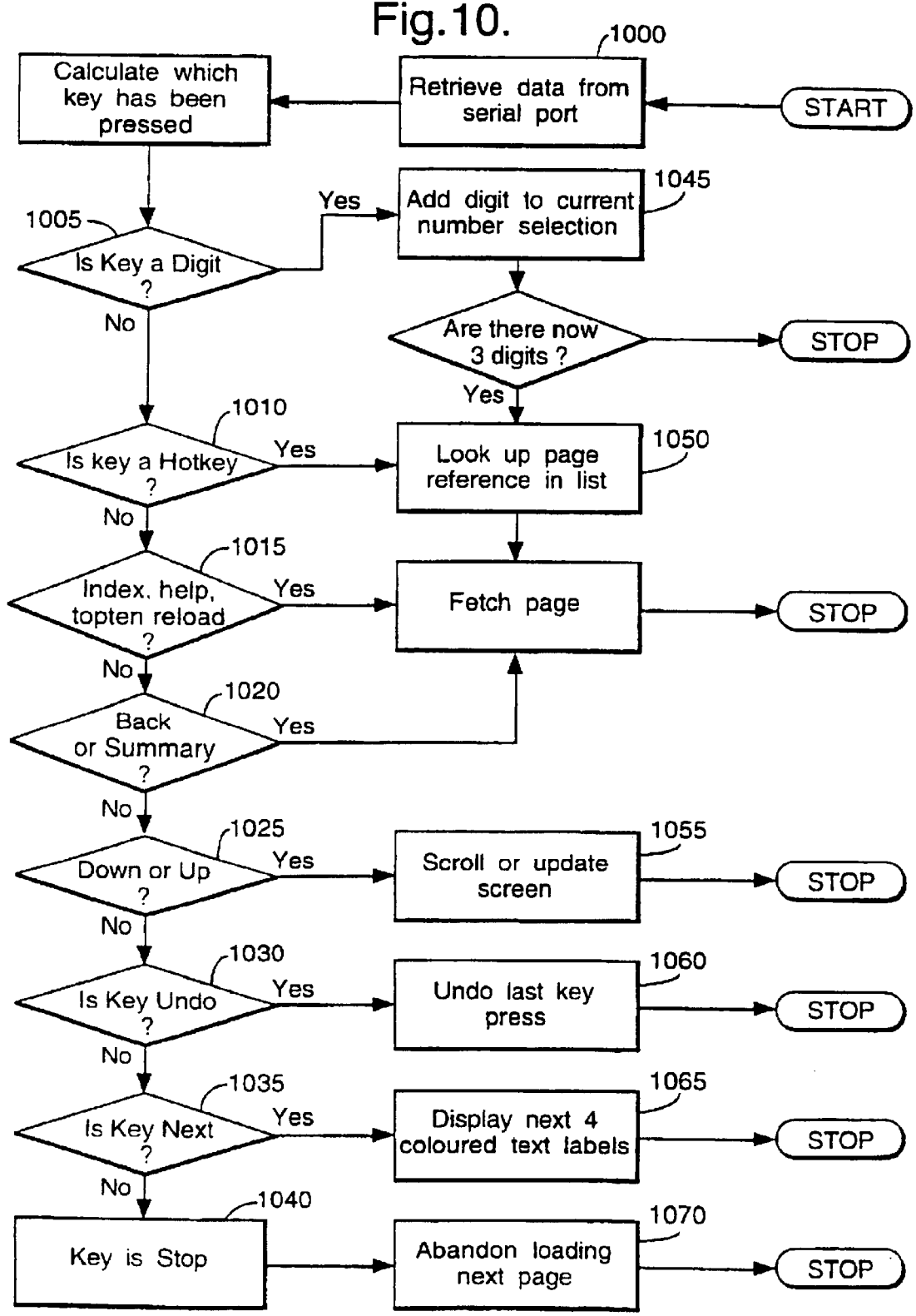
FIG. 10 shows a flow chart of a process for responding to user selections by means of the remote control handset of FIG. 3.

Referring to FIG. 10, the remote control handset 105 sends commands using a standard serial port protocol. When a button is pressed, a Windows event is generated which activates a subroutine with the function shown in FIG. 10. The user interface is thus a combination of the screen display 100 (specifically the coloured text labels) and the coloured buttons on the remote control 105.

When the button is pressed on the remote control 105, this activates the subroutine to retrieve the data incoming from the remote control 105 at the serial port, STEP 1000. The subroutine will then act on the data retrieved, firstly by matching the data against possible button identities, STEPS 1005, 1010, 1015, 1020, 1025, 1030, 1035. Depending on the outcome of each check, the subroutine will kick off a different process. For instance, if the key is found to be a digit key, STEP 1005, the subroutine will add the relevant digit to a current number selection store, STEP 1045. If there are now three digits in the current number selection store, this is sufficient to identify a page reference and the subroutine will translate the three digits to a page reference, STEP 1050, by reference to the link list maintained above at STEPS 630 and 640.

The subroutine is now enabled to fetch the page from the WWW.

If the key does not represent a digit but is a hotkey (that is, identifies a label), then the system will have sufficient information to go direct to the link list, STEP 1050, and fetch the page.

If the key provides any of the following functions, then the subroutine will fetch a page directly: "Index, Help, Top 10, Reload, Back or Summary", STEPS 1015, 1020.

The key may be a control key acting on the screen, such as "Down, Up, Undo", STEPS 1025, 1030. The subroutine will then scroll or update the screen or undo the last key press appropriately.

The key may have been the key "next", for displaying the next four coloured text labels. In this case, the subroutine will recognise the "next" command, STEP 1035, and display the labels as requested, STEP 1065. To support the "Next" key function, the system has a counter which counts the number of times the Next key has been pressed while viewing a document. This enables the system to track which set of four labels should be being displayed.

The last option in this embodiment is that the key represents a "stop" command, STEP 1040. The subroutine will respond by abandoning loading of the next page, STEP 1070.

An advantageous feature for embodiments of the present invention is to determine the order of links appearing in a page on screen, and therefore to control colour and/or number allocation, according to the position of the links of the screen rather than their order in the text. This can ensure that links will always appear in sequence when the document is read in a conventional direction, for instance from left to right and top to bottom in a Western environment. Problems can occur otherwise for instance in tables which can have the effect that numbers appear out of order on the screen—for instance when only a few links are visible in a multi-column table—the first column of links may only display one or two coloured or numbered links whilst the remaining columns have no coloured or numbered links.

This can be resolved by the system noting the co-ordinates of the links on the screen in the current viewed page whilst the page is being pre-processed. The links can be assigned to numbers in sequence according to their "y" and then their "x" co-ordinates. Once this order has been established, then the colours or numbers can be applied. This process will only need to be repeated for the page if the presentation of the page in the window changes, for example if the font size is changed.

Figure 11:
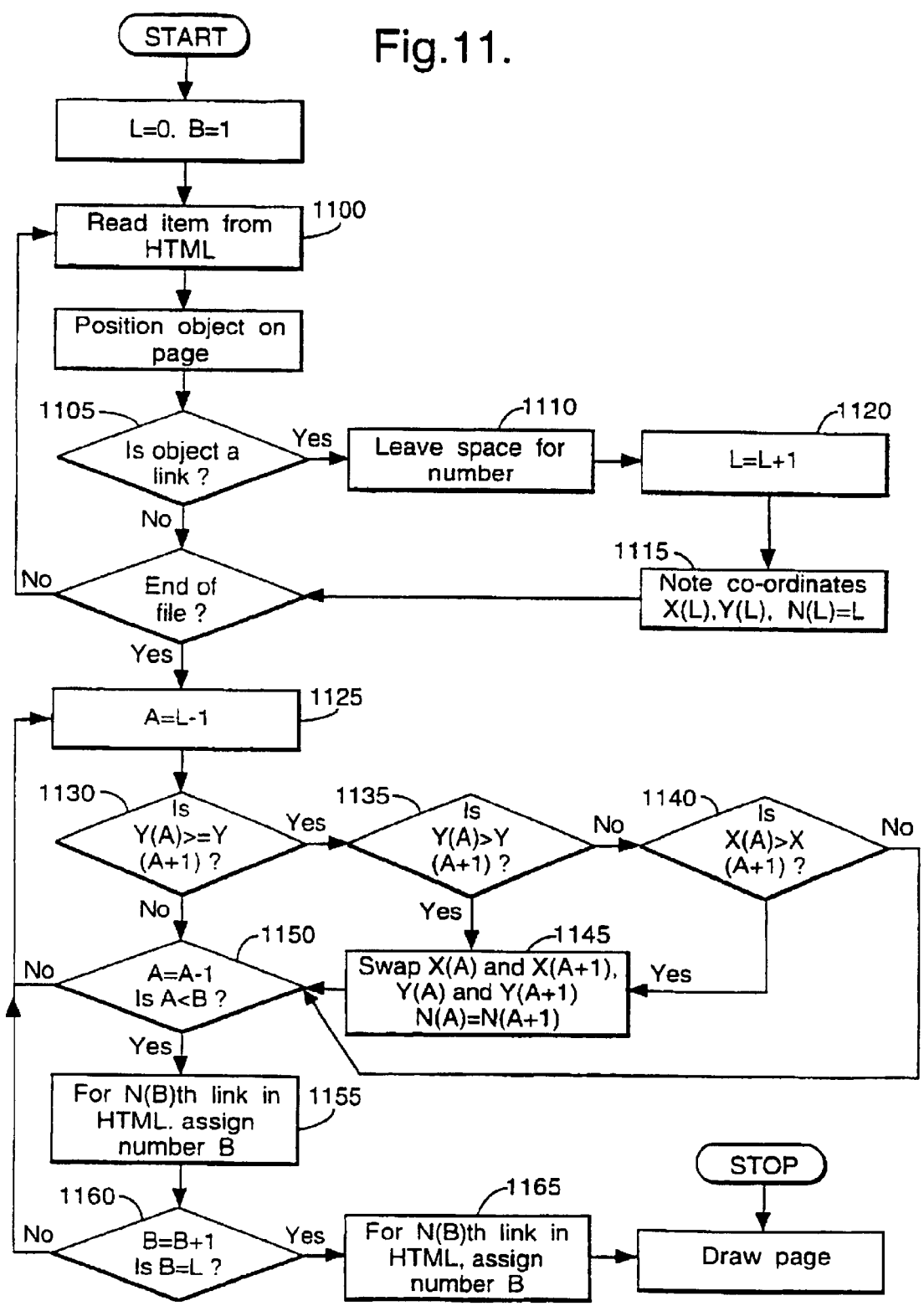
FIG. 11 shows a flow chart of a process for ordering links displayed on a display by Easy Terminal.

FIG. 11 gives an example of how improved link ordering could be implemented and the following description should be read in conjunction therewith.

The HTML is read in item by item (STEP 1100). An item is either a section of text, a code or object within the page. The size of each item is then calculated, and then 'placed' on the page with an X and Y coordinate relative to the top-left of the page. If the object is a link (STEP 1105), the space would be left for later insertion of the link number (STEP 1110). (If no improved link ordering was present, this link number would be a sequential number in the order in which the links were found in the HTML. Thus once the entire file had been read, the page could be drawn on screen).

However with improved link order, the X and Y co-ordinates of each link would be noted in integer arrays (STEP 1115) along with an index array N which would contain a sequentially assigned integer (L in the Figure) (STEP 1120).

Once the entire file has been read in, a ripple sort algorithm (STEPS 1125–1155) is used to find the link which is has the lowest Y co-ordinate, and is thus closest to the top of the page. If more than one link has the same Y co-ordinate, the links are ordered according to their X co-ordinate, so that the links read sequentially from left to right. This link is assigned to a number which is then increased by one. As the process is repeated, the links are thus ordered. Eventually the links are ordered according to their Y and X co-ordinates. The array N acts as a reference to the action which must be taken in the event of the link being selected.

For example, suppose the HTML is as follows

```
< table > < tr >
< td > < a href = "Item 1" > Apples > < /a > < br >
< a href = "Item2" > Bananas > < /a > < /td >
< td > < a href = "Item3" > Pears > < /a > < br >
< a href = "Item4" > Plums > < /a > < /td >
< /table >
```

On a standard HTML browser, this will produce a matrix of 4 links
Apples Pears
Bananas Plums
Without Improved Link ordering, in Easy Terminal, the links are numbered according to the order in which the links appear in the HTML code, thus the links will appear as
001 Apples 003 Pears
002 Bananas 004 Plums However, with Improved Link Ordering, the links will be re-ordered as:
001 Apples 002 Pears
003 Bananas 004 Plums
and the array N will contain the elements (1, 3, 2, 4). If the user now selects link 2, Easy Terminal can use the reference array N to see that the second element N(2) is 3, and thus the appropriate action is that of the third link in the HTML, i.e. to reference "Item3".

Figure 12:
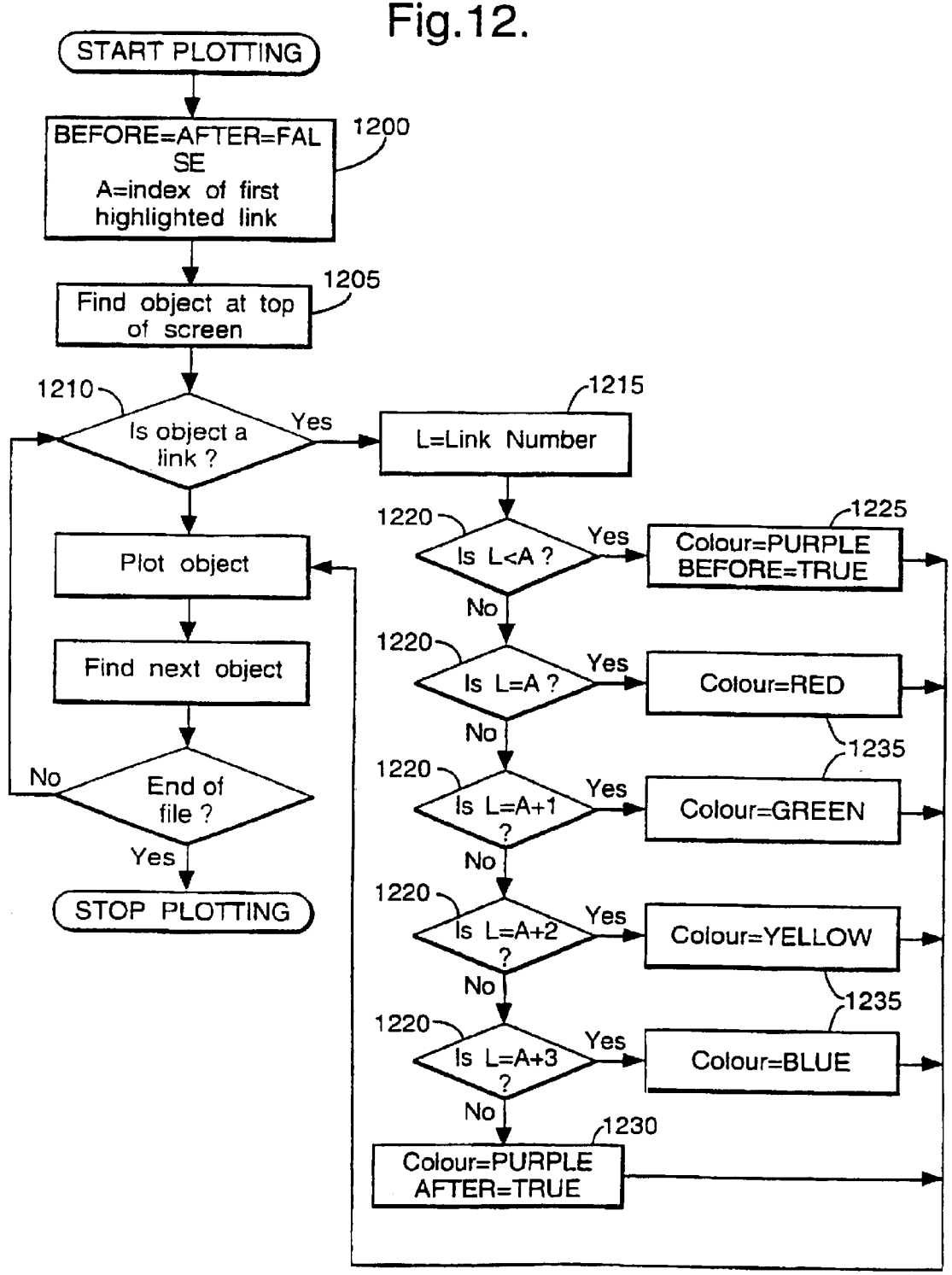
FIGS. 12 to 14 show flow charts of a process for clever scrolling of a screen display in Easy Terminal.
Figure 13:
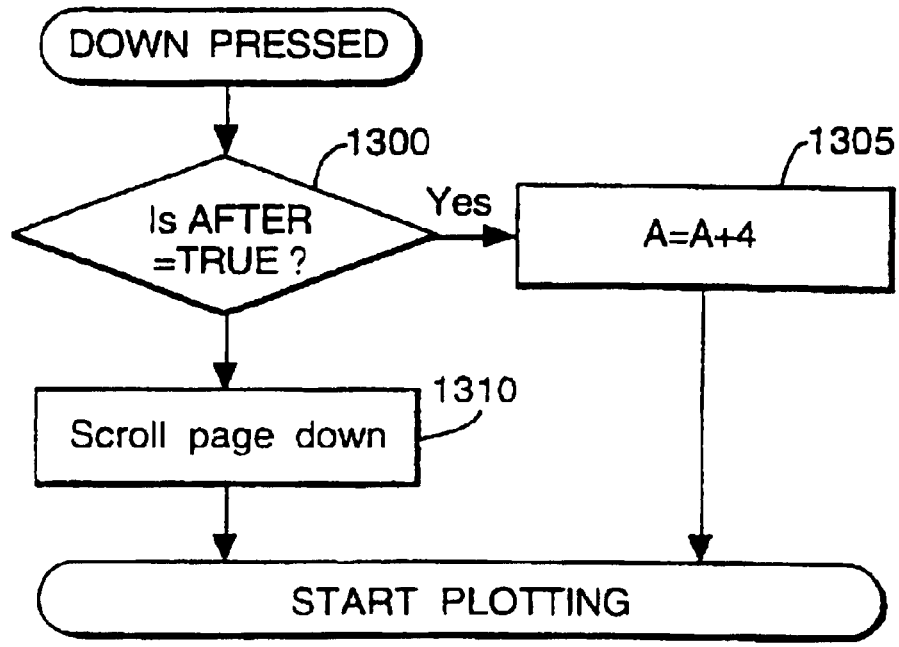
Figure 14:
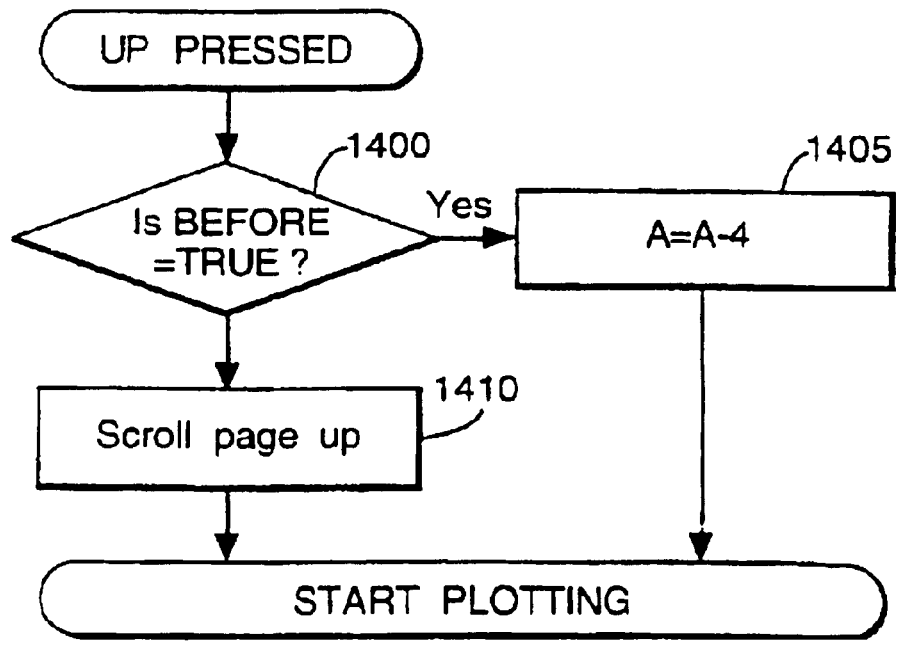

Referring to FIGS. 12 to 14, Easy Terminal can provide "clever scrolling" as follows.

In "clever scrolling", it is possible to make the colour of all the text uniform (normally black), and then highlight the available links (associated with the coloured text labels) with the four colours. It is also possible to colour the unavailable links with a default colour (for example purple) so that the links can be identified on the screen. The Next/Down button can thus be considered as a button which moves the coloured (red, green, yellow and blue) labelling to the next set of purple links, whilst the Back/Up button moves the colours to the previous set of purple links.

When a request is made to plot the current page in the available window on the screen, the index of the first 'active link' to which a coloured button is assigned is noted as A (STEP 1200). Then the location of the first object which is visible on the page is determined (STEP 1205). If this object is a link (STEP 1210), then the index of this link, L, is compared to A (STEP 1220). If L is less than A, then there are links present on the page which the user can access by pressing UP, and these links are coloured purple. A boolean flag BEFORE is set to TRUE (STEP 1225), indicating that there are links with an index less than A present on the page. Likewise if L>A+3 then there are links available to the user by pressing DOWN, so these links are also coloured purple, but the boolean flag AFTER is set to TRUE (STEP 1230). Otherwise, the link is associated with one of the coloured buttons, and is assigned to be RED, GREEN, YELLOW, or BLUE (STEPS 1235). This process is repeated until all the items visible on the page have been plotted, and assigned to appropriate colours.

Referring to FIG. 13, now if the user presses down and AFTER is TRUE (STEP 1300), then the active links are moved down the page by increasing A by 4 (STEP 1305). Otherwise, there are no further links on the page, and the page is therefore scrolled downwards if possible (STEP 1310).

Referring to FIG. 14, similarly if the user presses up and BEFORE is TRUE (STEP 1400), then the active links are moved up the page by decreasing A by 4 (STEP 1405). Otherwise, there are no further links on the page, and the page is therefore scrolled upwards if possible (STEP 1410).

Alternatives and Modifications

There are many alternative ways in which Easy Terminal could be implemented, which would provide a similar level of functionality to the user but with modifications to the hardware and software described. These are described and discussed below.

Although the specific embodiment described herein uses an IBM Compatible PC with an Ethernet connection, there are many alternative platforms on which the Easy Terminal could be implemented. Furthermore, the reprocessing and repurposing of the WWW information could be carried out remotely, or in the network, which could simplify the design of the user terminal hardware. Such an arrangement could be particularly appropriate where there are multiple users of the same system, such as in an interactive screen environment on an aeroplane for passengers.

A videophone could be used as a display for the Easy Terminal. Key stroke commands could either be taken from the videophone keypad, via speech recognition, or from an external controller.

A pager, watch, mobile phone or other mobile device could be used as an Easy Terminal to display processed WWW information and using 'minimum button set' navigation techniques as described herein.

The Easy Terminal software could of course run on any computer platform which had sufficient speed, memory and display capabilities. This could be provided for instance by a video recorder, satellite broadcast receiver, digital broadcast decoder, digital video player or a games console.

The Easy Terminal could run on an appropriately adapted "interactive TV" or "Video on Demand" system. This could be implemented either by running the Easy Terminal at the user's premises or at the content provider's. Thus in the first case, the data transmitted across the connection would consist of a conventional Internet data stream, and in the second it would consist of either an encoded video signal or an embedded data stream.

An Easy Terminal could be built in to a television receiver in much the same way that Teletext is currently included in the design of television receivers. In this case it would be possible to improve the quality of the display by using a non-interlaced high definition mode.

The Easy Terminal could be implemented in two parts: a standard Internet browser at the user terminal modified to interpret commands with a remote control 105, and a network based processor which modifies standard World Wide Web pages as appropriate.

The Easy Terminal could use any appropriate communications medium for the transfer of data. This includes, for example, a fixed or mobile telephone network, a broadcast TV service or radio paging service.

The Easy Terminal could use any suitable remote control unit 105, or alternative source of user commands. These could include:

Larger controllers with alphanumeric keys

Foot control pads, or controllers involving other parts of the human body

Connections other than infra-red, including radio or wired links.

User independent speech recognition could be used as a substitute for a key-based controller—thus simple words such as 'red' and 'next' or 'twenty-three' could provide the means of navigating between links.

In all of these alternatives, the principle of the Easy Terminal Navigation remains the same: the user does not have to position a pointer in order to activate a command. However, embodiments of the present invention do not exclude the use of a pointing device. A mouse or a trackball can still be used for instance. This enables the same user interface as a conventional browser but still brings advantages related to the present invention. For instance, an on-screen bar used for coloured text labels can be used as a way of quickly selecting links without the need to move the mouse pointer to the specific location of the actual link itself. This could be important to people whose control over the mouse is limited, eg by physical impairment or by an environmental condition such as severe vibration. The coloured text labels could be replaced by coloured boxes to make this relationship explicit for those with impaired vision—which links into the particular ability of embodiments of the present invention to display text at large font sizes. The mouse driver software could be adapted to restrict the mouse pointer position on the screen—limiting the movement to horizontal positions over the coloured text label bar for instance, or the position could be quantised to ease the selection of the four boxes/areas/labels.

For situations where a mouse is not appropriate, simpler control devices like paddles or foot controllers could be used to provide the same control ability as a mouse.

The Easy Terminal software could be written in any appropriate computer language or protocol. This could be implemented as a plug in to standard software, or in an Internet language such as Java.

A number of the features of the Easy Terminal could be implemented as processes carried out remotely with respect to the user. For example, the insertion of numbered links and coloured hot links need not necessarily be implemented at the user's terminal. Such a processor could be provided as a network or broadcast service.

The Easy Terminal could also provide rapid access to conventional Teletext pages. These pages could be displayed either as facsimiles of the source pages, or could be enhanced using the display, linking and navigation techniques described here.

A facility could be provided for the input of text. This could be achieved in a number of ways. Some possibilities include:

For any text field, the user could select from a number of options on the screen (this is known as a listbox or 'pop-out' box). The options which appear in the box could include items already known from the setup of the Easy Terminal (the owner's name, address, telephone number etc.) as well as a history of recently entered text.

The user could make any combination of letters up by selecting letters one by one from a scrolling or rotating list, or a grid of characters.

Characters could be associated with the numeric keypad by pressing more than one button at once.

Characters could be selected by pressing a button more than once. These characters could correspond to those currently written on telephone keypads.

For example, to select the character 'B' the '2' button would be pressed twice since it has the legend 'ABC'.

A full alphanumeric keypad could be included by having a larger number of buttons on the keypad, or the option of attaching a standard keyboard to the terminal.

The summarising features which are already part of the specific embodiment described above could be extended in a number of ways.

The user could be provided with the choice of a number of different levels of summary. This could be selected, for example, by repeated summary commands.

Summarising of text could be carried from one page to the next. Thus, once the summariser is activated, it would be operational until a command is given to disable it. This could be provided as an option or user preference.

The size of text used in HTML pages can be determined both by the author and the reader. The author of an HTML page can select the relative sizes of fonts with respect to a standard reference size; this can be varied throughout the document. The reader may select a scaling factor to enlarge or reduce this reference size. A control could be provided to remove certain resizing information from the text so that fonts which are too large or too small are displayed in more appropriate sizes.

In addition, the ratio between the largest and smallest font sizes used on the display may be reduced in order to suit the type of display. For example, on a computer screen, headings in large font sizes are appropriate, whilst the same large headings may appear too large when viewed in association with blocks of text on a television screen.

Improved Navigation by Colours

A control could be given to allow a user to set up a choice of standard colours for the background, the text and the links, or to use the colours and backgrounds as selected by the author of the page. A further refinement would allow only specific colour combinations to be allowed, whilst those which would significantly reduce the legibility of the page could be altered to maintain clarity.

As mentioned above, it is possible to use rectangular areas with coloured borders to indicate active areas. This can be extended to provide the option for coloured borders to picture elements (GIF graphics etc) on the screen. This enables links which are the equivalent of on-screen 'buttons' to be selected using colours.

Authors of HTML pages can suggest the background text and link colours for their pages. Certain colour combinations may be unsuitable for use with Easy Terminal's colour navigation schemes. One example of this might be the low contrast of a yellow link on a white page or a blue link on a black page. Easy Terminal overcomes this by adjusting the navigation colours according to the background selected. For example, a white background will cause the link colours to be darkened, etc. If a background colour is particularly close to one of the link colours, then Easy Terminal will darken the background and lighten the link colour until a reasonable level of contrast is provided.

Navigation between pages could be achieved using one or more of a number of possible alternative schemes:

Uniform Length Numbered Links

Numbered links of a uniform length within a page (e.g. 01 02 . . . 99) could be used to allow users with a numeric keypad to select a new page. The page retrieval could start as soon as the final digit is pressed. Note that the number of digits need not necessarily be three, as described above, and could be varied according to the number of links on the page. Thus a page with less than 10 links could use a single digit, whilst one with more than 10 would require two.

Variable Length Numbered Links

Numbered links with a length which is variable within a page could be used. The user could indicate the end of a number either by pressing a return key or by having a set time-out after which the end of the entry would be assumed. For example, links might be enumerated as (1, 2, 3 . . . 10, 11, 12). In this example, if a user pressed 1, there would be a time delay to allow the user to enter a second digit if required. On the other hand, if the user pressed 3, no time delay would be required as there are only 12 links on the page. By techniques such as these, users can navigate by means of numbers only and can remove the coloured text labels if required.

Coloured Text Labels displayed Separate to the Main Text Body

As described above, coloured text labels which contain summaries of the link text on the page or specially written text can be displayed at the bottom of the screen, and activated by means of associated coloured buttons on a keypad 105. The number of labels need not necessarily be four, of course, but could be varied according to the width of the screen. When more links are present on the screen than there are associated labels, one or two additional keys (Next in our specific embodiment) could be used to cycle through the available links forward and/or backward.

Note that if the display used could not show text in different colours, coloured markers could be printed at the bottom of the screen close to the labels so that the association of the labels with the buttons is apparent.

Coloured Text Links within the Main Text Body

In an alternative method of navigation, the labels need not carry any text at all, but just be different colours. This would involve removing the colour information from the main body of the text so that most of the text is displayed in one single colour (for example black). Links embedded in the text could then be displayed in different respective colours, associated with very simple coloured labels at the bottom of the screen. Thus, in the case of our specific embodiment, with four coloured labels, the first link in the text would appear red, the second green, and so on. One or two buttons on the keypad 105 could be provided to cycle through the links so that different links would be highlighted, ready for activation. Links in the text could indeed be coloured instead of the labels on the bottom of the page.

Although the specific embodiment described above uses alternative navigation schemes to access hypertext links within an HTML document, the same navigation scheme could be used to access HTML labels within forms or any other object on an HTML page.

Graphical image maps could be included in the navigation schemes by overlaying links on the images. Thus with a numbered navigation scheme, numbered links could be associated with areas of an image in many different ways. For example, the numbered link could flash over the active area of the image a number could be written beside the image with an arrow pointing to the active region With a coloured navigation scheme, the active areas of the image could be highlighted by means of, for example, a coloured frame round the active area of the image changes to the colour palette information over a local area of an image, so that part of an image appears predominantly the colour of a link colour a flashing filled area of the appropriate colour could indicate a link.

Since the links within a map are available as a map file, then the links contained within an image could be presented as a series of sets of four coloured text labels, which are scrollable using the Next command. In this case, the only description available for the link could be the address contained within the link itself, and so might contain useful information. One solution to this problem might be to pre-load the page pointed to by the link, and then use the title of that page as the text for the link label.

The number of keys used to control the system could be reduced or extended according to the hardware platform and the user requirements. A number of examples of variation in key layouts might be:

navigation between the pages could be done using either only numbers or only colours on scrolling the page up and down, as abovementioned the sets of four active links, ie with associated labels, could automatically be altered according to those currently visible on the screen. Thus the functions of Next and Down in the specific embodiment described above would be combined.

the function of Up and Back in the specific embodiment described above could be combined.

Audio could be used as a means of reinforcement. Thus different sounds could be played in response to key presses or commands.

Graphics display techniques could be used to make the operation of the Easy Terminal more intuitive and apparent. A number of examples are given below:

- A graphical indicator could be used to show the user how much and which part of a page is currently being displayed on a screen.
- The coloured text labels could be smoothly scrolled to indicate the relationship between different groups of labels. In the case of the specific embodiment described above, for example, upon pressing the Next button, the next four links would scroll into the visible part of the footer.
- Shading could be used to indicate that there are regions of the page which are not currently visible on screen.

For certain applications, access could be restricted to a subset of the Internet by using a set of specially designed pages which only contain links to other pages within the set. It would also be possible to remove families of links according to where they point. For example, all links could be removed which start with "http://undesirable.com".

Other Methods of Controlling Easy Terminal

'Back' key

Selecting the '0' button on a keypad can act as a synonym for the 'Back' key. Pressing # and * (or additional buttons on the keypad) will scroll the current page up and down by the height of the current screen window.

Remote Control

Easy Terminal may be controlled by other applications. Messages are passed from the controlling application to Easy Terminal using either Windows messaging (DDE, OLE, ActiveX, COM, Java) technique, or hooking into the mouse or keyboard driver (by emulating key-presses, for example) on the same computer, or from other computer(s) or equipment via the serial, parallel or network ports. In one implementation of Easy Terminal the network-based control is achieved by using TCP/IP. The use of Easy Terminal navigation with colours and numbers lends itself to remote control from other devices and to data-sharing applications because the controls and signals are not governed by screen layout.

In particular, the ability to user simple keyboard commands to provide control over the display of Web pages is not commonly available in other browsers—the control is normally assumed to be via the mouse. The selection of links is normally carried out by using the mouse to point to a link (normally underlined and coloured blue on a conventional browser display) and then clicking the mouse button—in Easy Terminal this can be achieved by using either the coloured text lables, or the coloured remote control buttons (or their equivalent). Scrolling on a conventional browser required precise movement of the mouse to the scroll bar, and then clicking or dragging, or else the use of the cursor keys on the keyboard. Easy Terminal's clever scrolling requires just the 'Next' or 'Back' buttons to achieve the same functions—and combines the on-screen highlighting of available links as well.

Easy Terminal thus allows keyboard control of a browser, which could be important for any use where a mouse is inconvenient or reduces efficiency. One example of this would be in a situation where a person, whose typing skills are required for inputting information into a computer, is also required to use a web-based page. Easy Terminal enables this person to keep their hands on the keyboard and still control and interact with the screen display. This could be particularly important in situations where time efficiency is paramount: Call Centres, Directory Enquiry and other 'bureau' based applications.

Linked Easy Terminals

Two Easy Terminal equipped computers can be linked together so that command and control messages can be transferred between them using one of the 'Remote Control' methods described above. This function is not currently available as a standard feature on other browsers. This allows the two Easy Terminals to be used for tutorial, education, illustration, form filling, and other instances where interactivity between more than one user is required. This is only possible because of the simple control interface to the web browser which Easy Terminal provides. For example if two conventional browsers were linked together using application sharing, then control information about mouse position would form the majority of the transferred control messages, whereas for Easy Terminal a few button press messages would be sufficient.

The types of information which can be exchanged are not restricted to just control messages. Additional information such as display settings, the current document URL, highlighted link and position within the document, current frame may also be transferred.

Highlighted Numbers

A number of known techniques may be used to highlight numbers on the page. This includes emboldening the number, displaying the number in "reverse video" (reversing number and background colour) or displaying the number with a different background colour.

Improved Page Presentation

Intelligent Masthead

The masthead which displays information to the user such as numbers pressed, the status of the current page or other instructions is only displayed where necessary. Thus when a page is fully loaded and is being displayed, the full area of the display is available.

Limited Width Pages

Standard HTML browsers allow pages to have variable widths and heights. If either the width or height exceeds the screen parameters then the user is given the ability to scroll the document across the screen. Easy Terminal allows the user to scroll the document up and down, but not left and right. In other words, the page is never allowed to exceed the display width. This is achieved in the following ways.

- Text is conveniently wrapped at spaces and line breaks such that it fills the width of the screen. However if a single word is wider than the screen than the document must be scrolled to view the word. In Easy Terminal the font size of the word is reduced such that it fits in the available space.
- If an image is wider than the screen then it is scaled preserving its aspect ratio so that it fits the screen.
- If a table is wider than the screen then its column widths are reduced such that the ratio of the desired widths remains constant. Text and images within a table are scaled to fit the table cell if required.

Redundant Link Removal

The HTML processor can consider two adjacent (successive) links on the same page as being the same. Thus a picture and accompanying text (which both point to the same URL) are indicated as the same link by colour and/or number, for example.

Form Control Objects

Conventional browsers use on-screen control objects to provide user interaction with devices like buttons, checkboxes and listboxes—typically used in forms. User interaction with these typically involves mouse clicks. The on-screen control, size and colour of these objects is fixed by the operating system and cannot be easily changed. When the font size used to display the text is changed, these objects do not scale to compensate, which means that, for large font sizes, they are disproportionately sized.

Easy Terminal can display standard HTML form control objects—but it displays these by redrawing them from graphics primitives rather than using the standard operating system provision. This enables the size and other properties of these objects to be controlled. For example, each form control object can have a colour, a number and is scaled according to the size of the current font.

Typical control objects include:

| Name | Function |
| --- | --- |
| button | submit a form or make a direct selection |
| radiobutton | select only one of a number of options |
| checkbox | select many options |
| combobox | select one of a number of pop-up options |
| listbox | selection one or more of a number of listed options |
| editbox | type in a single line alphanumeric string using a keyboard carousel |
| textarea | type in multiple alphanumeric strings |

Some of the form control objects can be assigned to special functions such as a control screen.

As with other Easy Terminal user interface features these control objects can be manipulated using numbers of colours. Some of these: the combobox, listbox, editbox and text area require the user to select items within the control, again by number or colour. In the case of the combobox and listbox, the items are numbered and coloured; in the edit box and text area, the carousel of letters is controlled via colour, and the control focus is shifted from the page to the control. Coloured links on the page temporarily revert to the default link colour whilst the focus is in the control object. The coloured text labels at the bottom of the screen reflect the current colour selection options available to the user—in the case—the control object options.

Once the user has completed the selection within the control object, the focus returns to the page, and the link coloring will return.

Slideshows

A Easy Terminal Slideshow consists of a series of files or URLs and timing information. When the slideshow is selected the URLs are displayed in sequence until interrupted by the user.

The slide show implementation of Easy Terminal uses files with the extension type.sho. These files consist of a list of times in seconds and URLs, for example:

10 URL1
5 URL2

In this example, URL1 will be shown for a period of 10 seconds, and URL2 will be shown for 5 seconds. After this, the cycle will be repeated until the user intervenes by pressing any of the control keys.

This functionality is attractive because no modifications are required to the pages in order for them to be used in a slide show.

This function can also be used with linked Easy Terminals where two users can view the same slide show. The slide show stops when either user presses a control key.

What is claimed is:

1. An access system for accessing a location in a network by activating a link in a file, which link contains a location address or an identifier for a location address, which system comprises:

i) means for retrieving one or more files;
ii) means for searching a file so retrieved to locate one or more links embedded therein;
iii) means for assigning a different respective identifier to any link so located;
iv) selection means for use by the user to select an assigned identifier from among the different respective identifier(s) assigned to any link so located and presented to the user for selection thereof;
v) activating means responsive to selection of an identifier to activate the associated link;
a display control output for use in displaying the file containing the link to be activated; and
means for determining spatial co-ordinates for links located in a file, said spatial coordinates relating each link to its location in the file when displayed, and the means for assigning an identifier assigns an identifier to each link in accordance with its spatial coordinates.

2. A system according to claim 1 wherein said spatial co-ordinates are based on perpendicular axes and the means for assigned an identifier gives preference to the co-ordinate for one of the perpendicular axes, in assigning identifiers to a respective link.

3. An access system according to claim 1 wherein the selection means comprises a command-based interface.

4. An access system for accessing a location in a network by activating a link in a file, which link contains a location address or an identifier for a location address, which system comprises:

i) means for retrieving one or more files;
ii) means for searching a file so retrieved to locate links embedded therein;
iii) means for assigning, to each of a plurality of links so located, a respective different identifier for presentation to a user;
iv) input means, comprising a command-based interface, for use by the user to input an identifier from among the respective different identifiers presented to the user; and
v) activating means responsive to input of an assigned identifier to activate the associated link.

5. A system as in claim 4 wherein the activating means activates the associated link so as to retrieve a file located at an address contained in or identified by that link.

6. A system as in claim 4 wherein the activating means activates the associated link so as to launch an application associated with the link.

7. A system as in claim 4 wherein the system further comprises a display control output for use in displaying the file containing the link to be activated.

8. A system as in claim 7 wherein the system is further provided with a user input for display control commands, and control means to receive such control commands and to control the display in accordance with said control commands.

9. A system as in claim 7 wherein means is provided to process at least one activatable link in a retrieved file, prior to display, so as to modify the on-screen appearance of the link.

10. A system as in claim 9 wherein the on-screen appearance of the link is modified by the addition of the identifier assigned to that link.

11. A system as in claim 10 wherein the identifier comprises a number.

12. A system as in claim 10 wherein the identifier comprises a color.

13. A system as in claim 7 wherein means is provided to process at least one activatable link in a retrieved file so as to generate a second on-screen appearance of the link.

14. A system as in claim 13 wherein means is provided to process at least two activatable links in a retrieved file so as to generate second on-screen appearances of each respective link, and means is provided to display a set of said second on-screen appearances of the links, separately from other content of said retrieved file.

15. A system as in claim 14 wherein said set comprises a smaller number of second on-screen appearances of processed links than the number of links in a retrieved file.

16. A system as in claim 15 said system being provided with link input control means for use by the user to input the links in a retrieved file whose second on-screen appearances appear in said set.

17. A system as in claim 16 wherein the system has means to respond to a scroll input, by means of the link input control means, to scroll the set of second on-screen appearances of links.

18. A system as in claim 17 wherein the means to respond to a scroll input comprises:
   i) means to compare the currently displayed set of second on-screen appearances of links with the currently displayed first on-screen appearances of the links in a retrieved file; and
   ii) means to scroll the portion of the retrieved file currently displayed in the event that the last of said set and the last of the first on-screen appearances of the links, in the scroll direction, both relate to the same link.

19. A system as in claim 13 wherein each said second on-screen appearance(s) of a processed link is different from the first on-screen appearance(s) of the associated processed link.

20. A system as in claim 13 wherein the means for processing links comprises a truncation device for generating a truncated version of a link, for inclusion for said second on-screen appearance.

21. A system as in claim 4 wherein the system is provided with a translation data store for use in translating an identifier, when inputted by use of said input means, to an activatable link.

22. A system as in claim 4 wherein the input means comprises a remote control device.

23. A system according to claim 22 wherein said remote control device is based on infra-red transmission.

24. A system as in claim 4 wherein the file is written in HyperText Markup Language.

25. A system as in claim 4 wherein the system further comprises display control means to control the on-screen appearance of a file, in addition to the on-screen appearance of one or more links embedded in the file.

26. A system as in claim 4 wherein the activating means activates the associated link so as to set up a communication connection in one or more communication networks.

27. A system as in claim 4 comprising a television display output for displaying a retrieved file.

28. An information network browser comprising a system as in claim 4.

29. A browser as in claim 28 further comprising means to process a retrieved file comprising means to identify an activatable link embedded in said file, to generate an identifier for a link so identified, and to display the identifier together with the link.

30. A browser as in claim 28 comprising input means including a keypad.

31. A browser according to claim 4 further comprising control means for use by the user to control the display.

32. An access system as in claim 4 wherein the input means is a keypad.

33. An access system as in claim 32 wherein the assigned identifier is a number.

34. An access system as in claim 32 wherein the assigned identifier is a colour and the user inputs the assigned identifier by activating a coloured button on the keypad.

35. An access system as in claim 4 wherein the input means comprises a voice recognition apparatus.

36. A computer terminal for accessing a location in a network by activating a link in a file, which link contains a location address or an identifier for a location address, the terminal comprising:
   i) a retriever for retrieving one or more files;
   ii) a searcher for searching a file so retrieved to locate links embedded therein;
   iii) an assignor for assigning, to each of a plurality of links so located, a respective different identifier;
   iv) display for displaying said identifiers;
   v) a keypad for use by the user to input an identifier from among the displayed identifiers; and
   vi) activator responsive to input of an assigned identifier to activate the associated link.

37. A terminal as in claim 36 wherein the display is operable to display the contents of the retrieved file and to display the assigned identifiers as a modification of the displayed file.

38. A terminal as in claim 37 wherein the modification is the addition of the display of characters constituting one of said identifiers, whereby said characters may be input via said keypad.

39. A terminal as in claim 37 wherein the modification is the display of links in said retrieved file in respective different colors, constituting said identifiers, and said keypad has keys bearing said colors.

40. A terminal as in claim 36 wherein the assignor is operable to assign up to a predetermined number of said identifiers, and in the event that the number of links in the retrieved file exceeds said predetermined number:
   (a) to assign said identifiers to first links in said retrieved file; and
   (b) upon receipt of a user input command, to reassign said identifiers to further links in said retrieved file.

41. A terminal as in claim 40 wherein the identifiers are a plurality of different colors and are arranged to display those links to which identifiers are currently assigned in the colors assigned to them, and to display further links, to which identifiers are not currently assigned, in a further distinctive color.

42. A terminal as in claim 36 operable in response to a scroll command to scroll said display and reassign said identifiers to links lying within that part of the retrieved file which becomes displayed following said scrolling.

43. A terminal as in claim 42 wherein the identifiers are a plurality of different colors and are arranged to display those links to which identifiers are currently assigned in the colors assigned to them, and to display further links, to which identifiers are not currently assigned, in a further distinctive color.

44. A terminal as in claim 36 wherein the display is operable to display the contents of the retrieved file in a first display area and to display the assigned identifiers in a second, separate display area.

45. A terminal as in claim 44 wherein each identifier is also marked upon a keypad key allocated thereto.

46. An access system for accessing location in a network by activating a link in a file, the system comprising:
   a retriever for retrieving one or more files;

a searcher for searching a file so retrieved to locate links embedded therein;

assignor for assigning a respective different identifier to each of a plurality of links so located for display to a user;

a command-based interface for use by the user to input an assigned identifier from among the respective different identifiers displayed to the user; and an activator, responsive to an input of the assigned identifier, to activate the link associated with the identifier.

47. A system as in claim 46, further comprising a processor which modifies the retrieved file so that the on-screen appearance of the retrieved file is modified by the addition of the identifier respectively assigned to each link, the identifier comprising at least one of a number and a color, so that the on-screen appearance of the retrieved file includes both the identifier and the link.

48. A method for accessing a location in a network by activating a link in a file, the method comprising:

retrieving one or more files;

searching a retrieved file to locate links embedded therein;

assigning a respective different identifier to each of a plurality of links so located;

presenting the respective different identifiers to a user;

receiving an input from the user through a command-based interface to receive an assigned identifier associated with one of the links from among the respective different identifiers; and activating the associated link responsive to the reception of the identifier.

49. A method as in claim 48 further comprising displaying the retrieved file including and displaying the assigned identifiers as a modification of the retrieved file.

50. A method as in claim 49 wherein the modification includes the addition of the display of characters constituting one of the identifiers.

51. A method as in claim 49 wherein the modification is the display of links in the retrieved file in respective different colors and the input received through the command-based interface involves a selection of one of the colors.

52. A method of accessing a location in a network by activating a link in a file, the method comprising:

retrieving one or more files;

searching a file so retrieved to locate one or more links embedded therein;

assigning a respective different identifier to any link so located;

presenting the identifier to any link so located to a user;

receiving a selection of an assigned identifier from among any identifier respectively assigned to any link so located;

in response to the selection of the identifier, activating the associated link; and determining spatial coordinates for links located in a file, said spatial coordinates relating each link to its location in the file when displayed and wherein assigning the identifier includes assigning an identifier to each link in accordance with its spatial coordinates.

* * * * *